Patented Sept. 22, 1953

2,653,098

UNITED STATES PATENT OFFICE 2,653,098

SELECTIVELY PUFFING GRANULAR MATERIAL AND THE RESULTING PRODUCT

John M. Baer, Chicago, Ill., assignor, by mesne assignments, to Coldset Foods Inc., a corporation of Delaware No Drawing. Application July 28, 1952,
Serial No. 301,383

6 Claims. (Cl. 99—82)

1

This invention relates to selectively puffing granular material and to the products so produced.

In my copending application, Serial No. 296,-963 filed July 2, 1952, now abandoned, I have disclosed a process of vacuum puffing materials in which the vacuum acts to cold set the product thereby terminating the plasticity of the material at a point prior to reimposition of atmospheric pressure.

I have now found that it is possible selectively to control the conditioning of materials so that cold setting may occur progressively, or may be limited to portions of the granules or may be caused to occur at a later period or not at all in a particular area.

This ability may be made use of in various ways. For example, in the treatment of dough products such as heavy corn meal dough pellets now employed in making products like that marketed under the trade-mark "Kix," or oat dough pellets such as are employed in the manufacture of the product sold under the trademark "Cheerios," it is possible to cold set the interior of the pellets before the exterior surfaces are cold set, thereby producing a much larger puffed pellet than was obtainable before, and at the same time avoiding clustering of the puffed pellets, which was heretofore a considerable source of loss. In fact it had previously been the practice with the Kix-type pellets to surface-treat with an inert vegetable oil in order to prevent sticking of the puffed pellets together. I am able to eliminate the oil entirely and yet have clustering of the order of ½–1% as compared to far greater percentages even when the oil was employed.

One means of preconditioning the granules is by a selective control of moisture content and temperature which results in a predetermination of vapor pressure in an area of the pellet to a point that the local vapor pressure is very much less than in other areas of the pellet. The corn-type pellets, which are made of a very heavy dough of corn meal, sugar, and flavoring agents with very little water as described in the Collatz Patent No. 2,162,376 are mixed at a very stiff consistency and then extruded to form small pellets approximately $\frac{3}{16}$ of an inch in diameter and $\frac{1}{16}$ inch thick with a roughened surface of somewhat roseate appearance, are quite dense, being somewhat heavier than water. They have a moisture content normally ranging from 12–18%. The corn type pellets employed in the examples in columns 4 and 5 are substantially

2 similar to the corn pellets set forth in the Collatz Patent No. 2,162,376, having approximately 86 parts of white corn cones (granular endosperm of white corn which has been degerminated), 2.5 parts of yellow corn cones, 3.0 parts of cane sugar, 2.0 parts of salt, 4.5 parts of tapioca flour, 3.0 parts of wheat germ (which has been partially roasted by heating to 140° C. to improve its keeping qualities) and .50 part of a mineral mixture comprising the following ingredients: 17.5% by weight, of monosodium phosphate, 36.8% by weight, of disodium phosphate, and 45.7% of calcium carbonate.

The oat type pellets such as described in the Collatz Patent No. 2,162,376 is the basis for the product sold under the trade-mark "Cheerios." It is made from an oat dough comprising oats, flour and sugar and flavoring ingredients which is formed into a heavy, very stiff dough, cooked, and extruded in the form of annuli approximately $\frac{1}{8}$–$\frac{1}{16}$ inch in diameter and $\frac{1}{16}$ inch thick, the center opening being slightly more than $\frac{1}{16}$ inch. These are likewise very heavy. They have a moisture content likewise ranging from 12–18%.

As an example of the pre-treatment, 20 pounds of the corn meal pellets having an original moisture content of approximately 12% were placed in a rotating screen 24 inches in diameter and 36 inches in length and were rotated thirty times per minute immediately above two banks of gas burners, being only far enough away to avoid direct flame contact. The burners created an atmosphere of about 350–400° F. in temperature. The products were rotated from 35 to 45 minutes to bring the exterior temperature of the pellets to 270–280° F. and to bring the moisture content to about half of the original. The exact time of heating and the exact rate of heating may vary for different products under different conditions, but if heating is too rapid, the puffed product will have a soft and spongy texture and if it is too long, the product will not puff properly.

At the conclusion of the drying, the preferred product has a moisture content of about 6% average and the exterior surface is at about 270° F. It has not yet been possible to make accurate moisture determinations as between the various portions of the tiny particles, but it is assumed that the exterior shell of the material has substantially zero moisture content and zero vapor pressure and that the temperature goes down when the moisture content goes up as one moves inward from the anhydrous shell. Thus, the vapor pressure on the inside of the shell is higher than at the surface, although presumably with the difference in temperature from the outside in, the vapor pressure, once the shell has been passed, has no great inequalities at the existing temperatures.

I have found that the existence of a shell of different characteristics can readily be shown by pressing an individual pellet under measured pressure. I have found that when employing a torque wrench, the shell ruptures at about 100 pounds, shattering from the remainder of the pellet which remains substantially the same shape as before but, of course, smaller when the exterior of the pellets has been flame dried. If the pellets are allowed to stand for a fairly short time, however, this characteristic disappears.

After pre-treatment, the pellets are puffed, preferably by the method disclosed in my application already referred to. In order to do this, the pellets are placed in a closed chamber, the air is removed by evacuation, and then steam is introduced to cook the product and raise its temperature and vapor pressure sufficiently to provide for the subsequent puffing.

In view of the high temperature of the products which are transferred immediately from the oven to the cooking chamber, it is not necessary to evacuate to a low point to remove air from the pellets, since the residual moisture creates a considerable vapor pressure and the air may be washed out at a correspondingly high absolute pressure. Normally, it is sufficient to go to a pressure of 10 inches of mercury absolute. Steaming is determined by the amount of cooking required by the particular pellets. With the corn dough pellets described, I prefer to raise the pressure rapidly with the steam to about 50 pounds gauge (65 pounds absolute) and then hold it for approximately four minutes. The product is then puffed by shooting the product into a chamber of enormously greater size in which the pressure is close to zero absolute—as, for example, about 0.2 inch of mercury absolute. Evacuation should be continued during the puffing to help in avoiding ride up of the pressure.

The resulting corn dough product has a size from 10 to 15 times the original and it is found that on opening the individual pellets there is a large central void, but the outer shell is unbroken and is of substantially the same shape as the original pellet. Clustering is substantially absent.

The exact mechanism of the process is not yet completely understood, but it is theorized that what occurs is that in the steaming operation the outer portions of the pellets, even though drier than the inside, can only take up a limited amount of moisture because of their high temperature, the condensation of steam ceasing when the vapor pressure of the shell and of the steam itself are equal and this will occur at about the temperature of the steam. Thus, if the shell of the pellet is at 260° F. and the steam is at 360° F., the introduction of saturated steam, which is preferred, will result in the condensation of roughly 5% by weight of water in the outer shell before its temperature has been raised to 360° F. Condensation will then cease in that portion of the granule. The interior of the pellet, even though more moist, is also cooler and, therefore, it will accept more moisture from the steam than the outer portions, further increasing the imbalance or disequilibrium of the pellet.

When the pellet is shot into the vacuum, water will evaporate from the pellet so long as there is water in the respective portions thereof, until the temperature of the product has been brought down by the evaporation to one corresponding substantially to the boiling point of water at the particular pressure employed. Thus if the vacuum is not permitted to rise above 2 inches of mercury absolute, the temperature in the product would reach an equilibrium at about 100° F. However, since the outer portions have only, say, 5% moisture this will be given up by the time those portions reach the original moisture content that they had on going into the cooker. That is, if they went into the cooker at 260° F., they will have no further moisture to give up when they get back to about 260° F. Thus, the dryness, or at least the comparative dryness, of the surfaces is assured, and at the same time, the temperature of the shell of the pellets will be above the temperature in the interior, since those portions have more moisture and will continue to give it up and thus cool until they have reached a cold setting temperature.

The result appears to be that the shell of the pellets remains plastic after the central portions have been cold set and there is a progressive change from the shell inwardly, those portions immediately adjacent the shell presumably remaining plastic longer than those at the center. This would account for the continuity of the shell and the discontinuity of the interior produced by the puffing explosion. Furthermore, even if the shell should remain plastic at the termination of the puff, it is relatively unimportant so long as the underlying portions have cold set sufficiently to support themselves and the shell upon reimposition of atmospheric pressure.

With the oat pellets, substantially the same procedure is employed.

Examples of applying the method of this invention to heavy corn meal dough pellets described previously and marketed under the trademark "Kix" are:

*Example I*

40 pounds of corn dough pellets were flame dried in an atmosphere of about 350° to 400° F. for 37 minutes. The pellets were then transferred immediately from the oven to a cooking chamber and subjected to a pressure of about 10 inches of mercury absolute. They were then subjected to a steam pressure of 50 pounds per square inch gauge and held at this pressure for 4 minutes to cook the pellets. The steam pressure was then quickly raised to 100 pounds per square inch gauge, following which the pressure was instantaneously reduced to about 0.2 inch of mercury absolute. Evacuation was continued during puffing in order to avoid ride up of the pressure.

*Example II*

40 pounds of corn dough pellets were treated in the same manner as Example I, except that they were flame dried for a period of 45 minutes.

*Example III*

40 pounds of corn dough pellets were treated in the same manner as Example I, except that they were flame dried for a period of 47 minutes.

*Example IV*

40 pounds of corn dough pellets were treated in the same manner as in Example I, except that they were flame dried for a period of 35 minutes and the pressure just prior to puffing was 80 pounds per square inch gauge instead of 100 pounds per square inch gauge.

*Example V*

40 pounds of corn dough pellets were treated in the same manner as in Example IV, except that they were flame dried for a period of 45 minutes.

The puffed corn dough pellets from Examples I to V were very satisfactory, having the above described characteristics.

Examples of applying the method of this invention to heavy oat dough pellets marketed under the trade-mark "Cheerios," are:

*Example VI*

40 pounds of oat dough pellets described previously were flame dried in an atmosphere of about 350° to 400° F. for 45 minutes. The pellets were then transferred immediately from the oven to a cooking chamber and subjected to a pressure of about 10 inches of mercury absolute. They were then subjected to a steam pressure of 50 pounds per square inch gauge and held at this pressure for 4 minutes to cook the pellets. The steam pressure was then quickly raised to 100 pounds per square inch gauge, following which the pressure was instantaneously reduced to about 0.2 inch of mercury absolute. Evacuation was continued during puffing in order to avoid ride up of the pressure.

*Example VII*

40 pounds of oat dough pellets were treated in the same manner as in Example VI, except that they were flame dried for a period of 25 minutes instead of 45 minutes.

*Example VIII*

40 pounds of oat dough pellets were treated in the same manner as in Example VI, except that they were flame dried for a period of 40 minutes instead of 45 minutes.

*Example IX*

40 pounds of oat dough pellets were treated in the same manner as in Example VI, except that the pellets were subjected to a steam pressure of 50 pounds per square inch gauge for a period of 2 minutes instead of 4 minutes.

*Example X*

40 pounds of oat dough pellets were treated in the same manner as in Example VI, except that the pellets were cooked at a steam pressure of 50 pounds per square inch gauge for a period of 3 minutes instead of 4 minutes prior to subjecting the pellets to 100 pounds per square inch gauge.

*Example XI*

40 pounds of oat dough pellets were treated in the same manner as in Example VI, except that they were flame dried for a period of 50 minutes instead of 45 minutes and cooked at a steam pressure of 40 pounds per square inch gauge for 3 minutes.

*Example XII*

40 pounds of oat dough pellets were treated in the same manner as in Example VI, except that the pellets were flame dried for a period of 90 minutes instead of 45 minutes.

*Example XIII*

40 pounds of oat dough pellets were treated in the same manner as in Example VI, except that the pellets were flame dried for a period of 40 minutes instead of 45 minutes and were cooked at a steam pressure of 75 pounds per square inch gauge for 5 minutes, following which the pressure was instantaneously reduced to 0.2 inch of mercury absolute.

The puffed oat dough pellets from Examples VI to XII were very satisfactory.

Those puffed pellets resulting from Examples VI and VII had no voids, were uniform in color and size, and had a glazed outer surface. The puffed pellets from Examples VIII to XII were like those from Examples VI and VII, except that they were more golden in color. Those pellets from Example XIII were similar to those from Examples VIII to XII, except that the pellets were darker in color and the outer surfaces were not glazed.

The foregoing detailed description is given for clearness of understanding only, and no unnecessary limitations should be understood therefrom, for some modification will be obvious to those skilled in the art.

I claim:

1. The process which comprises heating dough pellets having an original moisture content of the order of 12–22% in atmosphere at a temperature of the order of 350–400° F. until the surface temperature of the pellets has reached approximately 270–280° F. and then promptly shooting the pellets into a vacuum zone wherein they are puffed and cold set.

2. The process which comprises heating dough pellets having an original moisture content of the order of 12–22% in atmosphere at a temperature of the order of 350–400° F. until the surface temperature of the pellets has reached approximately 270–280° F., removing the air from the pellets and then introducing steam to cook the same before the exterior has substantially cooled and then shooting the pellets into a vacuum wherein they are puffed and cold set.

3. The process which comprises gradient drying a moist granule of a dough product to a point where the outside portion of the granule is much drier than the interior portion, said outside portion forming an outer shell which separates from the remainder of the granule when said dried granule is subjected to a sufficient torque wrench pressure; adding steam thereto at increased pressure and temperature while the outside portion is still much drier than the interior portion to raise the moisture content thereof and cook the product; and then shooting the product into a vacuum zone whereby it is puffed and cold set.

4. The process which comprises flame drying a moist granule of a dough product to a point where the outside portion of the granule is much drier than the interior portion, said outside portion forming an outer shell which separates from the remainder of the granule when said dried granule is subjected to a sufficient torque wrench pressure; adding steam thereto at increased pressure and temperature while the outside portion is still much drier than the interior portion to raise the moisture content thereof and cook the product; and then shooting the product into a vacuum zone whereby it is puffed and cold set.

5. The process which comprises flame drying a moist granule of a dough product to a point where the outside portion of the granule is much drier than the interior portion, said outside portion forming an outer shell which separates from the remainder of the granule when said dried granule is subjected to a sufficient torque wrench pressure; removing air from the granule while the outside portion is still much drier than the interior portion; adding steam thereto at increased pressure and temperature while the outside portion is still much drier than the interior portion to raise the moisture content thereof and cook the product; and then shooting the product into a vacuum zone whereby it is puffed and cold set.

6. A cold set, vacuum puffed dough product produced by the process of claim 3.

JOHN M. BAER.

References Cited in the file of this patent

UNITED STATES PATENTS

| Number | Name | Date |
| --- | --- | --- |
| 1,933,158 | Bohn et al. | Oct. 31, 1933 |
| 2,162,376 | Collatz | June 13, 1939 |
| 2,246,528 | Musher | June 24, 1941 |
| 2,261,456 | Warren | Nov. 4, 1941 |
| 2,278,464 | Musher | Apr. 7, 1942 |
| 2,295,116 | Kellogg | Sept. 18, 1942 |